(12) United States Patent
Lee et al.

(10) Patent No.: US 12,195,087 B2
(45) Date of Patent: Jan. 14, 2025

(54) FRAME STRUCTURE FOR A PURPOSE BUILT VEHICLE

(71) Applicants: HYUNDAI MOTOR COMPANY, Seoul (KR); KIA CORPORATION, Seoul (KR)

(72) Inventors: Won Hae Lee, Seoul (KR); Nam Ho Kim, Gwangmyeong-si (KR); Byung Joo Chung, Gunpo-si (KR); Seung Hak Lee, Anyang-si (KR); Min Seok Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 84 days.

(21) Appl. No.: 17/948,352

(22) Filed: Sep. 20, 2022

(65) Prior Publication Data
US 2023/0227105 A1     Jul. 20, 2023

(30) Foreign Application Priority Data
Jan. 19, 2022   (KR) .......................... 10-2022-0008024

(51) Int. Cl.
*B62D 21/02*     (2006.01)
*B62D 21/11*     (2006.01)

(52) U.S. Cl.
CPC .............. *B62D 21/02* (2013.01); *B62D 21/11* (2013.01)

(58) Field of Classification Search
CPC ...... B62D 21/02; B62D 21/11; B62D 27/023; B62D 23/005; B60K 2001/0416
See application file for complete search history.

(56) References Cited

U.S. PATENT DOCUMENTS 4,557,519 A * 12/1985 Matsuura ........... B62D 25/2027
                                                                 296/187.11
5,507,522 A     4/1996 Ritchie
(Continued)

FOREIGN PATENT DOCUMENTS

CN            102442194 A      5/2012
DE    102004058380 A1 *  6/2006   ........... B60G 21/055
(Continued)

OTHER PUBLICATIONS

DE-102004058380-A1 Machine English Translation (Year: 2006).*
(Continued)

*Primary Examiner* — Jason D Shanske
*Assistant Examiner* — Matthew James O'Neill
(74) *Attorney, Agent, or Firm* — Lempia Summerfield Katz LLC

(57) ABSTRACT

A frame structure for a purpose built vehicle (PBV) includes: an inner panel connected to the rear of a middle part of a side member to form an inner side of a rear part of the side member, a front outer panel connected to the rear of the middle part of the side member and coupled to an outer side of the inner panel to form a closed cross-section, a center outer panel connected to the rear of the front outer panel and coupled to the outer side of the inner panel to form a space in which a rear suspension member is coupled, and a rear outer panel connected to the rear of the center outer panel and coupled to the outer side of the inner panel to form a closed cross-section.

10 Claims, 6 Drawing Sheets

(56) References Cited

U.S. PATENT DOCUMENTS

| | | | | |
|---|---|---|---|---|
| 7,237,829 B2 * | 7/2007 | Latimer, III | ....... | B62D 25/2036 |
| | | | | 296/187.11 |
| 9,156,504 B2 * | 10/2015 | Terada | ..................... | B60G 3/20 |
| 10,882,559 B2 * | 1/2021 | Gündogan | ............. | B62D 21/11 |
| 2010/0244396 A1 * | 9/2010 | Onda | ..................... | B60G 3/285 |
| | | | | 280/124.111 |
| 2021/0331749 A1 | 10/2021 | Hwang et al. | | |

FOREIGN PATENT DOCUMENTS

| | | | | | |
|---|---|---|---|---|---|
| DE | 102004010699 B4 | * | 1/2020 | .............. | B60G 7/02 |
| JP | 2000313361 A | * | 11/2000 | | |
| JP | 2001097242 A | | 4/2001 | | |
| JP | 3350599 B2 | | 11/2002 | | |
| JP | 5617144 B2 | | 9/2014 | | |
| JP | 7158518 B2 | * | 10/2022 | ............. | B60G 7/008 |
| KR | 20130033749 A | | 4/2013 | | |
| KR | 20210130883 A | | 11/2021 | | |
| WO | 2009004473 A2 | | 1/2009 | | |

OTHER PUBLICATIONS

JP-2000313361-A Machine English Translation (Year: 2000).*
DE-102004010699-B4 Machine English Translation (Year: 2020).*
JP-7158518-B2 Machine English Translation (Year: 2022).*

\* cited by examiner

FRAME STRUCTURE FOR A PURPOSE BUILT VEHICLE

CROSS REFERENCE TO RELATED APPLICATION

The present application claims priority to and the benefit of Korean Patent Application No. 10-2022-0008024, filed Jan. 19, 2022, the entire contents of which are incorporated herein by reference.

BACKGROUND

Field of the Disclosure

The present disclosure relates to a technology for a frame structure applicable to a purpose built vehicle (PBV).

Description of the Related Art

A purpose built vehicle (PBV) includes a life module in which various types of boarding and loading space are provided according to market needs and a drive module relating to the actual traveling of a vehicle. Coupling the life module to a fixed drive module as demanded by various needs facilitates the production of various vehicle models, thereby allowing a very effective response to the market trends of high-mix low-volume production.

The rear wheel suspension of a conventional vehicle uses a separate bracket on the outer side of the side member of the vehicle frame so that the front side of the suspension may be supported. In the case of a PBV in which a high voltage battery (simply referred to as "battery" hereinafter) is used, the gap between the side members on either side of the frame is widened to allow easier mounting of the battery. Accordingly, it is difficult to support the front side of the rear wheel suspension by the outer side of the side member as in a conventional vehicle.

The matters described above as a background of the present disclosure are intended only to improve understanding of the background of the present disclosure and are not to be taken as acknowledgment that the matters described above pertain to the conventional art already known to those of ordinary skill in the art.

SUMMARY

The present disclosure provides a frame structure for a purpose built vehicle (PBV) in which a battery is mounted. In particular, the frame structure allows the front side of the rear suspension to be compactly and firmly fixed to the frame without protruding outside the vehicle, thereby ensuring easier mounting of battery in the PBV and providing excellent rigidity against a rear collision of the vehicle.

According to one embodiment of the present disclosure, a frame structure for a PBV includes: an inner panel connected to the rear of a middle part of a side member to form an inner side of a rear part of the side member; a front outer panel connected to the rear of the middle part of the side member and coupled to an outer side of the inner panel to form a closed cross-section; a center outer panel connected to the rear of the front outer panel and coupled to the outer side of the inner panel to form a space in which a rear suspension member is coupled; and a rear outer panel connected to the rear of the center outer panel and coupled to the outer side of the inner panel to form a closed cross-section.

The inner panel may form a kick-up portion extending upward from the rear of the middle part, and the center outer panel may be installed at a position where the kick-up portion starts in the rear of the middle part.

The center outer panel may include: a front bulkhead sealing the rear of the front outer panel; a rear bulkhead sealing the front of the rear outer panel; an upper cover portion coupled to an upper surface of the front outer panel and an upper surface of the rear outer panel between the front bulkhead and the rear bulkhead; and an outer cover portion to which the front bulkhead, the rear bulkhead, and the upper cover portion are connected and which forms an outer surface of the side member.

An opening portion into which the rear suspension member may be inserted may be formed on the lower side of the kick-up portion of the side member by the front bulkhead, the rear bulkhead, and the outer cover portion of the center outer panel, and the inner panel.

Support portions rotatably supporting the rear suspension member may be formed to respectively protrude toward each other in the outer cover portion of the center outer panel and the inner panel opposite thereto.

Shaft mounting holes into which a rotating shaft of the rear suspension member may be inserted may be respectively formed in the support portion of the outer cover portion and the support portion of the inner panel.

A first coupling surface to be coupled to the inner panel and a second coupling surface to be coupled to the front outer panel may be integrally formed in the front bulkhead of the center outer panel, and a third coupling surface to be coupled to the inner panel and a fourth coupling surface to be coupled to the rear outer panel may be formed in the front bulkhead of the center outer panel.

A fifth coupling surface to be coupled to the front outer panel and a sixth coupling surface to be coupled to the rear outer panel may be integrally formed in the upper cover portion of the center outer panel.

A rear cross member extending in the lateral direction of the vehicle may be coupled to the inner panel across from a portion to which the center outer panel is coupled.

In another embodiment of the present disclosure, the frame structure for a PBV includes: a side member forming the frame of the vehicle and extending in the front/rear direction to be disposed on either side of the vehicle; and an opening portion into which a rear suspension member is inserted to be coupled to the lower side of the kick-up portion of the side member.

A center outer panel forming the opening portion may be installed in a kick-up portion of the side member, and an inner panel may be installed on an inner side of the center outer panel while forming the opening portion.

A front outer panel may be installed to form a closed cross-section together with the inner panel in front of the center outer panel, and a rear outer panel may be installed to form a closed cross-section together with the inner panel in the rear of the center outer panel.

The center outer panel may include: a front bulkhead sealing the rear of the front outer panel; a rear bulkhead sealing the front of the rear outer panel; an upper cover portion coupled to an upper surface of the front outer panel and an upper surface of the rear outer panel between the front bulkhead and the rear bulkhead; and an outer cover portion to which the front bulkhead, the rear bulkhead, and the upper cover portion are connected and which forms an outer surface of the side member.

Support portions rotatably supporting the rear suspension member may be formed to respectively protrude toward each other in the outer cover portion of the center outer panel and the inner panel opposite thereto.

Coupling surfaces to be coupled to the inner panel and the front outer panel are integrally formed in the front bulkhead of the center outer panel, coupling surfaces to be coupled to the inner panel and the rear outer panel are integrally formed in the rear bulkhead of the center outer panel, and coupling surfaces to be coupled to the front outer panel and the rear outer panel are integrally formed in the upper cover portion of the center outer panel.

A rear cross member connecting the side members on either side to each other may be provided on an inner side of a portion in which the opening portion of the side member is formed.

The present disclosure discloses a frame applicable to a PBV in which a battery is mounted, the frame allowing the front side of the rear suspension to be compactly and firmly fixed to the frame without protruding outside the vehicle, thereby ensuring easier mounting of the battery in the PBV and providing excellent rigidity against a rear collision of the vehicle.

BRIEF DESCRIPTION OF THE DRAWINGS

In order that the disclosure may be well understood, there will now be described various forms thereof, given by way of example, reference being made to the accompanying drawings, in which.

Figure 1:
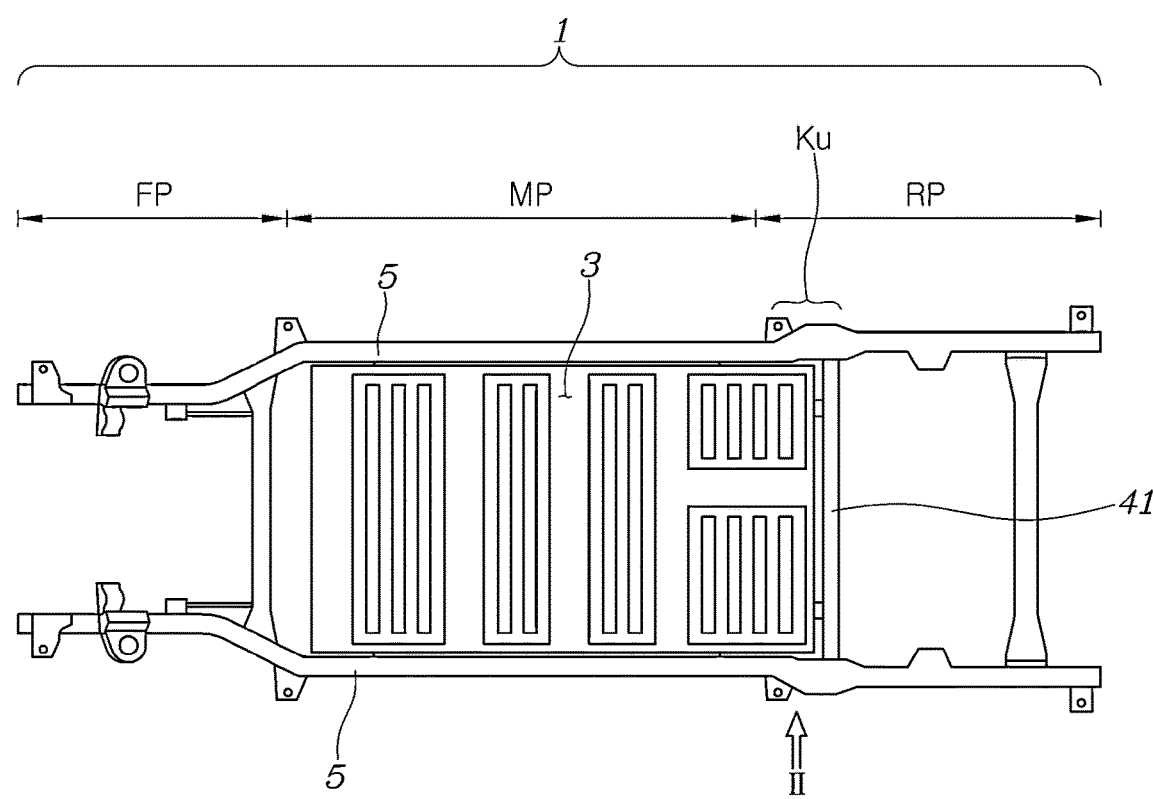
FIG. 1 is a plan view illustrating a frame structure for a purpose built vehicle (PBV) according to one embodiment of the present disclosure.
Figure 2:
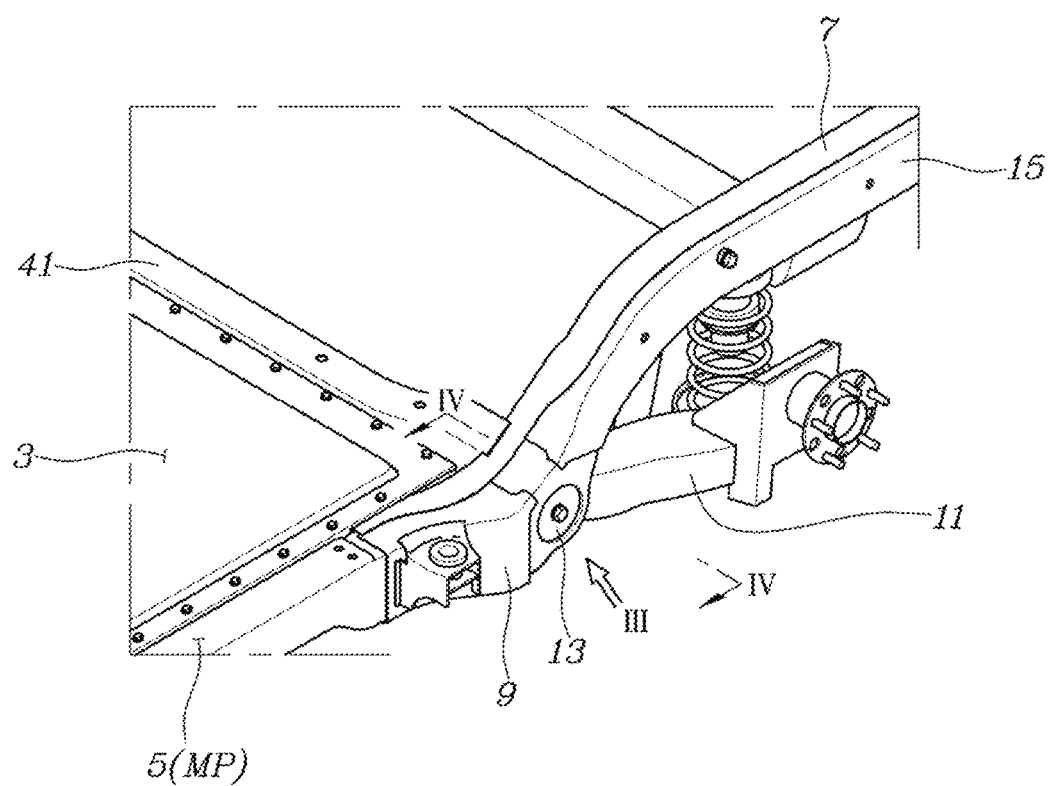
FIG. 2 is an observation view illustrating a frame structure for a PBV viewed in II direction in FIG. 1.
Figure 3:
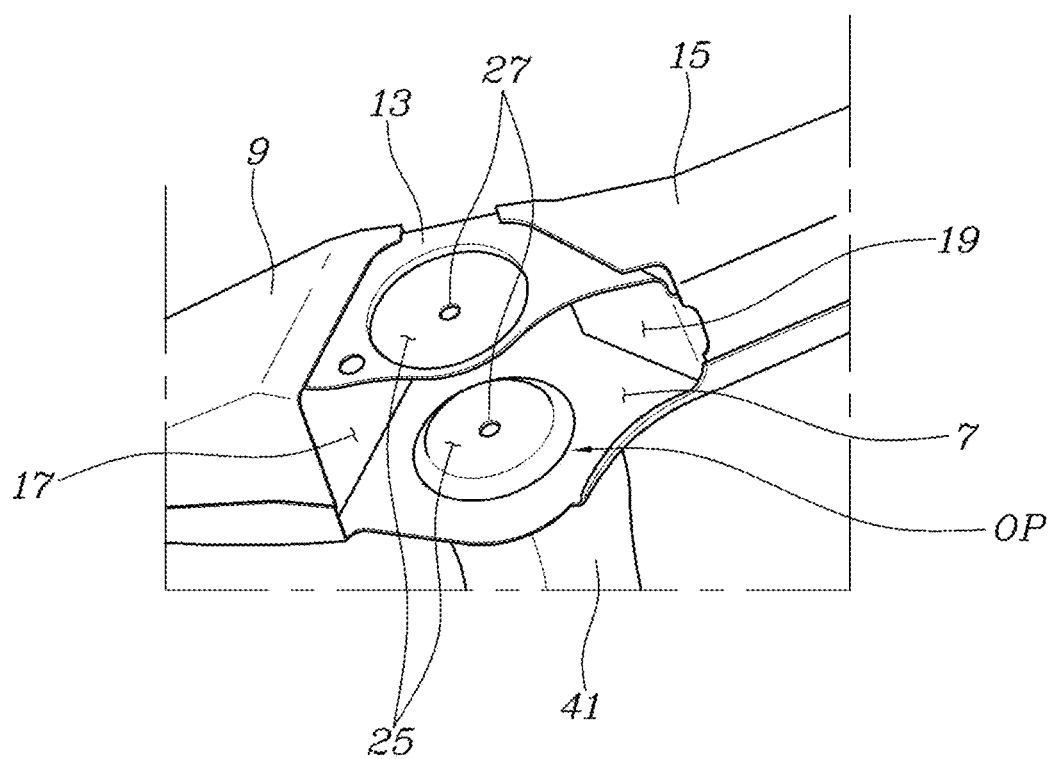
FIG. 3 is an observation view illustrating a frame structure for a PBV viewed in III direction in FIG. 2.
Figure 4:
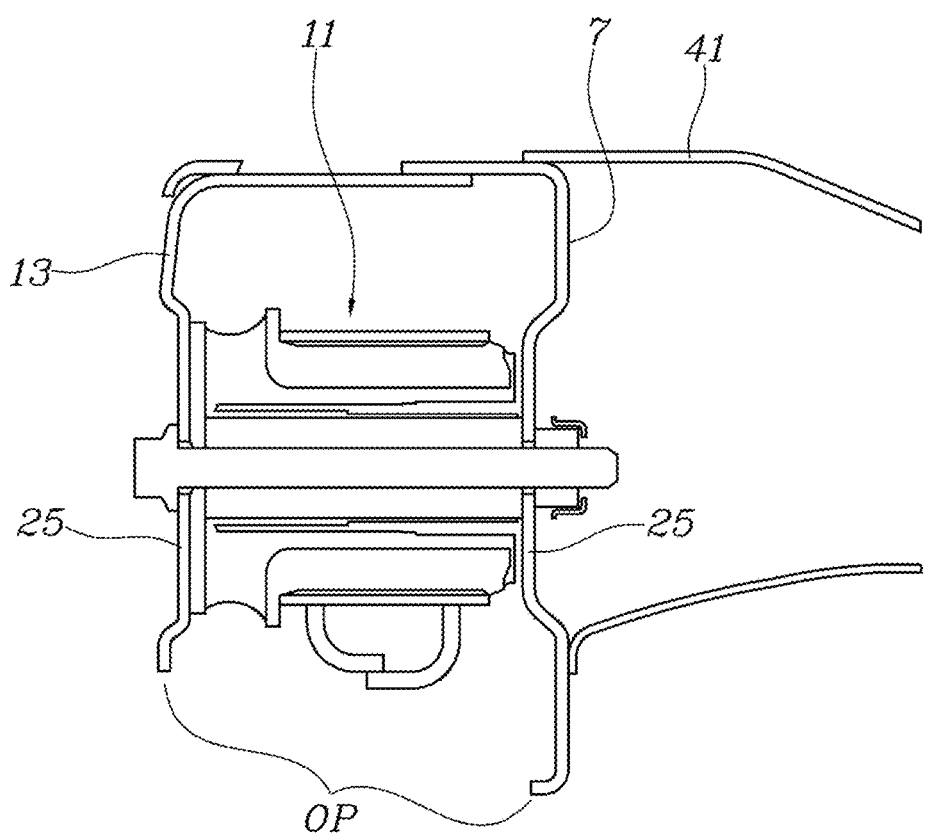
FIG. 4 is a cross-sectional view illustrating a frame structure for a PBV taken along the line IV-IV in FIG. 2.

The drawings described herein are for illustration purposes only and are not intended to limit the scope of the present disclosure in any way.

DETAILED DESCRIPTION OF THE DISCLOSURE

The specific structural or functional descriptions of the embodiments disclosed in the present specification or application are merely exemplified for the purpose of describing the embodiments according to the present disclosure. The embodiments of the present disclosure may be implemented in various forms, and the present inventive concept is not to be interpreted as being limited to the embodiments described in the present disclosure or application.

The embodiment according to the present disclosure may be subject to various modifications and have various forms. Specific embodiments are illustrated in the drawings and described in detail in the present disclosure or application. It is to be understood that this is not intended to limit the concept of the present disclosure to the specific disclosed forms and that all modifications, equivalents, and substitutes within the spirit and technical scope of the present inventive concept are included.

Terms such as first, second, etc. may be used to describe various components, but the components are not to be limited by the terms. The terms may only be used for the purpose of distinguishing one component from another. For example, without departing from the scope of the present disclosure, a first component may be denoted as a second component, and similarly, a second component may also be denoted as a first component.

When a component is referred to as being "connected" or "coupled" to another component, the component may be directly connected or coupled to the another component, but it is to be understood that other components may exist in between. On the other hand, when a component is referred to as being "directly connected" or "directly coupled" to another component, it is to be understood that there are no intervening components present. Other expressions describing a relationship between components, that is, "between", "just between", "neighboring", and "directly neighboring" are to be interpreted in the same manner.

The terms used herein are used for the purpose of describing specific embodiments only and are not intended to limit the disclosure. Singular expressions include plural expressions unless the context explicitly indicates otherwise. In the present specification, terms such as "comprise" or "have" are intended to designate the presence of implemented features, numbers, steps, operations, components, parts, or combinations thereof described in the specification and are not to be understood to preclude the presence or additional possibilities of one or more of other features, numbers, steps, operations, components, parts or combinations thereof in advance.

Unless otherwise defined, all terms used herein, including technical or scientific terms, may have the same meanings as are generally understood by those of ordinary skill in the art to which the present disclosure pertains. The terms such as those defined in commonly used dictionaries are to be interpreted as having meanings consistent with their meanings in the context of the related technology and are not to be interpreted in an idealized or overly formal sense unless expressly so defined herein. When a component, device, element, or the like of the present disclosure is described as having a purpose or performing an operation, function, or the like, the component, device, or element should be considered herein as being "configured to" meet that purpose or perform that operation or function.

Hereinafter, the present inventive concept is described in detail by describing embodiments of the present disclosure with reference to the accompanying drawings. The same reference numerals presented in each drawing refer to the same members.

FIG. 1 is a view illustrating a frame structure for a purpose built vehicle (PBV) to which the present disclosure is applied and presents an example in which the frame 1 may be divided into a front part FP, a middle part MP, and a rear part RP in the length direction of a vehicle and a battery 3 is mounted on an inner side of the middle part MP.

FIGS. 2-6 further show that, according to an embodiment of the present disclosure, the frame structure for the PBV includes an inner panel 7 connected to the rear of a middle part MP of a side member 5 to form an inner side of a rear part RP of the side member 5, a front outer panel 9 connected to the rear of the middle part MP of the side member 5 and coupled to an outer side of the inner panel 7 to form a closed cross-section, a center outer panel 13 connected to the rear of the front outer panel 9 and coupled to the outer side of the inner panel 7 to form a space in which a rear suspension member 11 is coupled, and a rear outer panel 15 connected to the rear of the center outer panel 13 and coupled to the outer side of the inner panel 7 to form a closed cross-section.

In other words, the rear part RP of the side member 5 is made of the inner panel 7 on the inside of the vehicle and the front outer panel 9, the center outer panel 13, and the rear outer panel 15 in sequential order from the front rearward on the outside of the vehicle. The center outer panel 13 is configured to form a space to which the rear suspension member 11 is coupled inside the side member 5.

Accordingly, the front side of the rear wheel suspension is allowed to be compactly and firmly fixed to the frame 1 without protruding outside the vehicle, and a sufficient distance between the side members 5 on either side is secured, thereby ensuring easier mounting of the battery 3 in the PBV.

The inner panel 7 forms a kick-up portion KU extending upward from the rear of the middle part, and the center outer panel 13 is installed at a position where the kick-up portion KU starts in the rear of the middle part MP.

The center outer panel 13 includes a front bulkhead 17 sealing the rear of the front outer panel 9, a rear bulkhead 19 sealing the front of the rear outer panel 15, an upper cover portion 21 coupled to an upper surface of the front outer panel 9 and an upper surface of the rear outer panel 15 between the front bulkhead 17 and the rear bulkhead 9, and an outer cover portion 23 to which the front bulkhead 17, the rear bulkhead 19, and the upper cover portion 21 are connected and which forms an outer surface of the side member 5.

Figure 5:
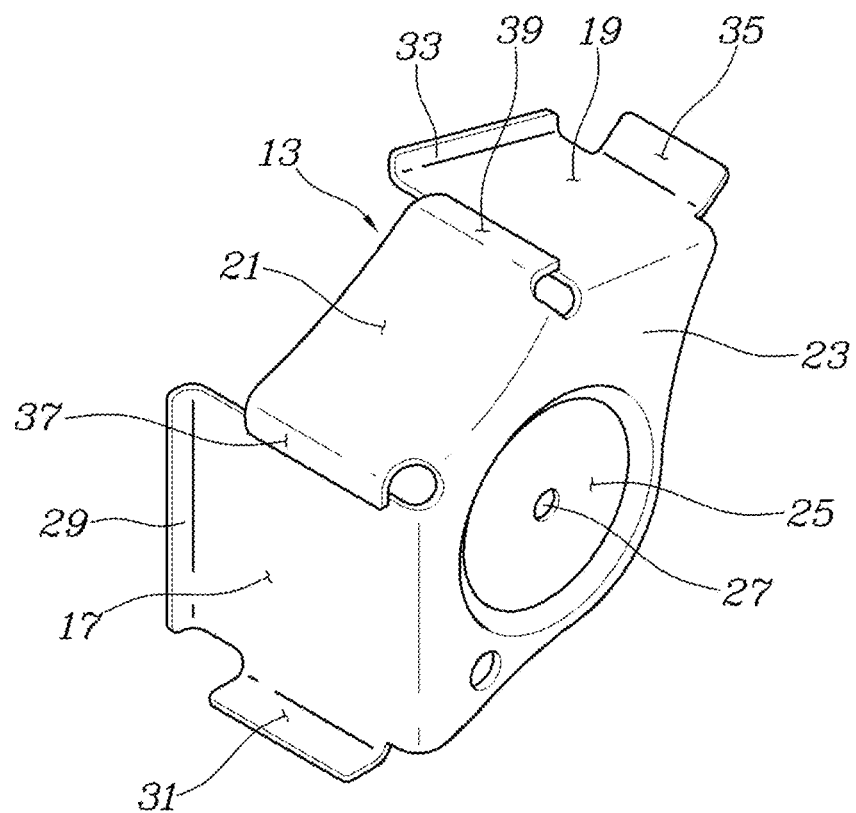
FIG. 5 is a perspective view of a center outer panel in one embodiment of the present disclosure.
Figure 6:
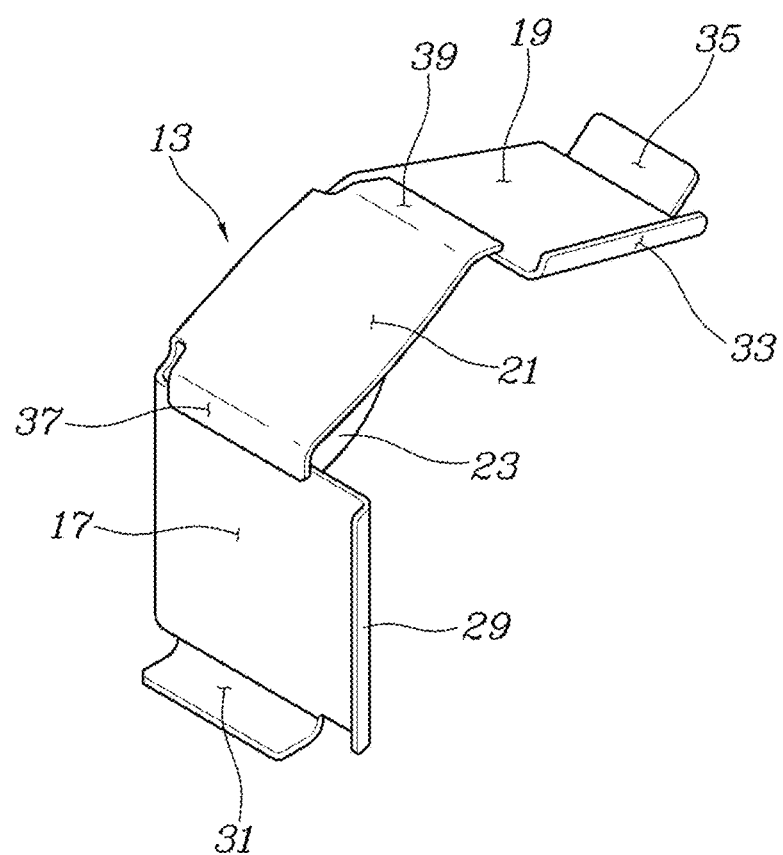
FIG. 6 is a view illustrating a center outer panel to be mounted on the right side of a vehicle symmetrically with the center outer panel in FIG. 5.

In other words, as illustrated in FIGS. 5 and 6, one panel bends a plurality of times such that the front bulkhead 17, the rear bulkhead 19, and the upper cover portion 21 are integrally formed around the outer cover portion 23.

Since the center outer panel 13 as described above is coupled to the outside of the inner panel 7 at a position where the kick-up portion KU of the side member 5 starts, an opening portion OP into which the rear suspension member 11 may be inserted is formed by the front bulkhead 17, the rear bulkhead 19, the outer cover portion 23 of the center outer panel 13 and the inner panel 7 on a lower side of the kick-up portion KU of the side member 5.

In other words, the center outer panel 13 forming the opening portion OP is installed in the kick-up portion KU of the side member 5, and the inner panel 7 is installed on an inner side of the center outer panel 13 to form the opening portion OP.

Accordingly, the rear suspension member 11 is coupled in an inserted state through the opening portion OP provided on the lower side of the kick-up portion KU of the side member 5, so that the rear suspension member 11 is coupled inside the side member 5 without protruding outside, thereby allowing compact vehicle assembly.

In addition, as described above, the front bulkhead 17 of the center outer panel 13 prevents foreign substances from entering the closed cross-section formed by the front outer panel 9 and the inner panel 7 and strengthens the rigidity of the coupling portion in which the center outer panel 13 is coupled to the front outer panel 9 and the inner panel 7 so that stronger rigidity may be provided against a rear-end collision and the like of a vehicle.

The rear bulkhead 19 of the center outer panel 13 also prevents foreign substances from entering the closed cross-section formed by the rear outer panel 15 and the inner panel 7 and strengthens the rigidity of the relevant portion.

Support portions 25 rotatably supporting the rear suspension member 11 are formed to respectively protrude toward each other in the outer cover portion 23 of the center outer panel 13 and the inner panel 7 opposite thereto.

In the present embodiment, the support portions 25 protrude in a circular shape and respectively provided with shaft mounting holes 27 into which a rotating shaft of the rear suspension member 11 may be inserted.

Accordingly, a structure is formed such that the rear suspension member 11 may smoothly rotate without interference from other portions of the side member 5 according to the changes in the relative position of the wheel with respect to the frame while the vehicle travels so that the suspension may function properly without generating noise or vibration.

In the present embodiment, a first coupling surface 29 to be coupled to the inner panel 7 and a second coupling surface 31 to be coupled to the front outer panel 9 are integrally formed in the front bulkhead 17 of the center outer panel 13, and a third coupling surface 33 to be coupled to the inner panel 7 and a fourth coupling surface 35 to be coupled to the rear outer panel 15 are integrally formed in the rear bulkhead 19 of the center outer panel 13.

In addition, a fifth coupling surface 37 to be coupled to the front outer panel 9 and a sixth coupling surface 39 to be coupled to the rear outer panel 15 are integrally formed in the upper cover portion 21 of the center outer panel 13.

The plurality of coupling surfaces provided in the center outer panel 13 as described above are coupled to the inner panel 7, the front outer panel 9, and the rear outer panel 15 by welding and the like so that the very high rigidity around the center outer panel 13 may be secured so that the battery 3 fixed in front of the center outer panel 13 may be effectively prevented from being damaged by an impact force input from the rear of the vehicle.

On the other hand, a rear cross member 41 connecting side members 5 on either side to each other is provided on an inner side of the portion where the opening portion OP of the side member 5 is formed.

The rear cross member 41 extending in the lateral direction of the vehicle is coupled to the inner panel 7 across from a portion to which the center outer panel 13 is coupled.

The rear cross member 41 is supported while a certain distance is maintained to the rear of the battery 3 so that the effect on the battery 3 of the impact force input from the rear of the vehicle is minimized.

Specific embodiments of the present disclosure are illustrated and described, but it should be self-evident to those of ordinary skill in the art that the present disclosure may be variously improved upon and modified within a scope not deviating from the technical spirit of the present disclosure.

What is claimed is:

1. A frame structure for a purpose built vehicle (PBV), comprising:
an inner panel connected to a rear of a middle part of a side member to form an inner side of a rear part of the side member;
a front outer panel connected to the rear of the middle part of the side member and coupled to an outer side of the inner panel to form a closed cross-section;
a center outer panel connected to the rear of the front outer panel and coupled to the outer side of the inner panel to form a space in which a rear suspension member is coupled; and
a rear outer panel connected to the rear of the center outer panel and coupled to the outer side of the inner panel to form a closed cross-section, wherein:
the inner panel forms a kick-up portion extending upward from a rear of the middle part,
the center outer panel is installed at a position where the kick-up portion starts in the rear of the middle part, and
the center outer panel includes:
a front bulkhead sealing a rear of the front outer panel,
a rear bulkhead sealing a front of the rear outer panel,
an upper cover portion coupled to an upper surface of the front outer panel and an upper surface of the rear outer panel between the front bulkhead and the rear bulkhead, and
an outer cover portion to which the front bulkhead, the rear bulkhead, and the upper cover portion are abutted and which forms an outer surface of the side member, and
wherein an opening portion into which the rear suspension member is inserted is formed on a lower side of the kick-up portion of the side member by the front bulkhead, the rear bulkhead, and the outer cover portion of the center outer panel and the inner panel.

2. The frame structure of claim 1, wherein support portions rotatably supporting the rear suspension member are formed to respectively protrude toward each other in the outer cover portion of the center outer panel and the inner panel opposite thereto.

3. The frame structure of claim 2, wherein shaft mounting holes into which a rotating shaft of the rear suspension member is inserted are respectively formed in the support portion of the outer cover portion and the support portion of the inner panel.

4. The frame structure of claim 1, wherein:
a first coupling surface to be coupled to the inner panel and a second coupling surface to be coupled to the front outer panel are integrally formed in the front bulkhead of the center outer panel, and
a third coupling surface to be coupled to the inner panel and a fourth coupling surface to be coupled to the rear outer panel are integrally formed in the rear bulkhead of the center outer panel.

5. The frame structure of claim 4, wherein a fifth coupling surface to be coupled to the front outer panel and a sixth coupling surface to be coupled to the rear outer panel are integrally formed in the upper cover portion of the center outer panel.

6. The frame structure of claim 1, wherein a rear cross member extending in a lateral direction of the vehicle is coupled to the inner panel across from a portion to which the center outer panel is coupled.

7. A frame structure for a purpose built vehicle (PBV), comprising:
a side member forming a frame of a vehicle and extending in a front/rear direction of the vehicle and disposed on either side of the vehicle; and
an opening portion into which a rear suspension member is inserted to be coupled to a lower side of a kick-up portion of the side member,
wherein:
a center outer panel forming the opening portion is installed in the kick-up portion of the side member,
an inner panel is installed on an inner side of the center outer panel while forming the opening portion,
a front outer panel is installed to form a closed cross-section together with the inner panel in front of the center outer panel,
a rear outer panel is installed to form a closed cross-section together with the inner panel in the rear of the center outer panel, and
the center outer panel includes:
a front bulkhead sealing a rear of the front outer panel,
a rear bulkhead sealing a front of the rear outer panel,
an upper cover portion coupled to an upper surface of the front outer panel and an upper surface of the rear outer panel between the front bulkhead and the rear bulkhead, and
an outer cover portion to which the front bulkhead, the rear bulkhead, and the upper cover portion are abutted and which forms an outer surface of the side member.

8. The frame structure of claim 7, wherein support portions rotatably supporting the rear suspension member are formed to respectively protrude toward each other in the outer cover portion of the center outer panel and the inner panel opposite thereto.

9. The frame structure of claim 7, wherein:
coupling surfaces to be coupled to the inner panel and the front outer panel are integrally formed in the front bulkhead of the center outer panel,
coupling surfaces to be coupled to the inner panel and the rear outer panel are integrally formed in the rear bulkhead of the center outer panel, and
coupling surfaces to be coupled to the front outer panel and the rear outer panel are integrally formed in the upper cover portion of the center outer panel.

10. The frame structure of claim 7, wherein a rear cross member connecting the side members on either side to each other is provided on an inner side of a portion in which the opening portion of the side member is formed.

* * * * *